Patented June 16, 1925.

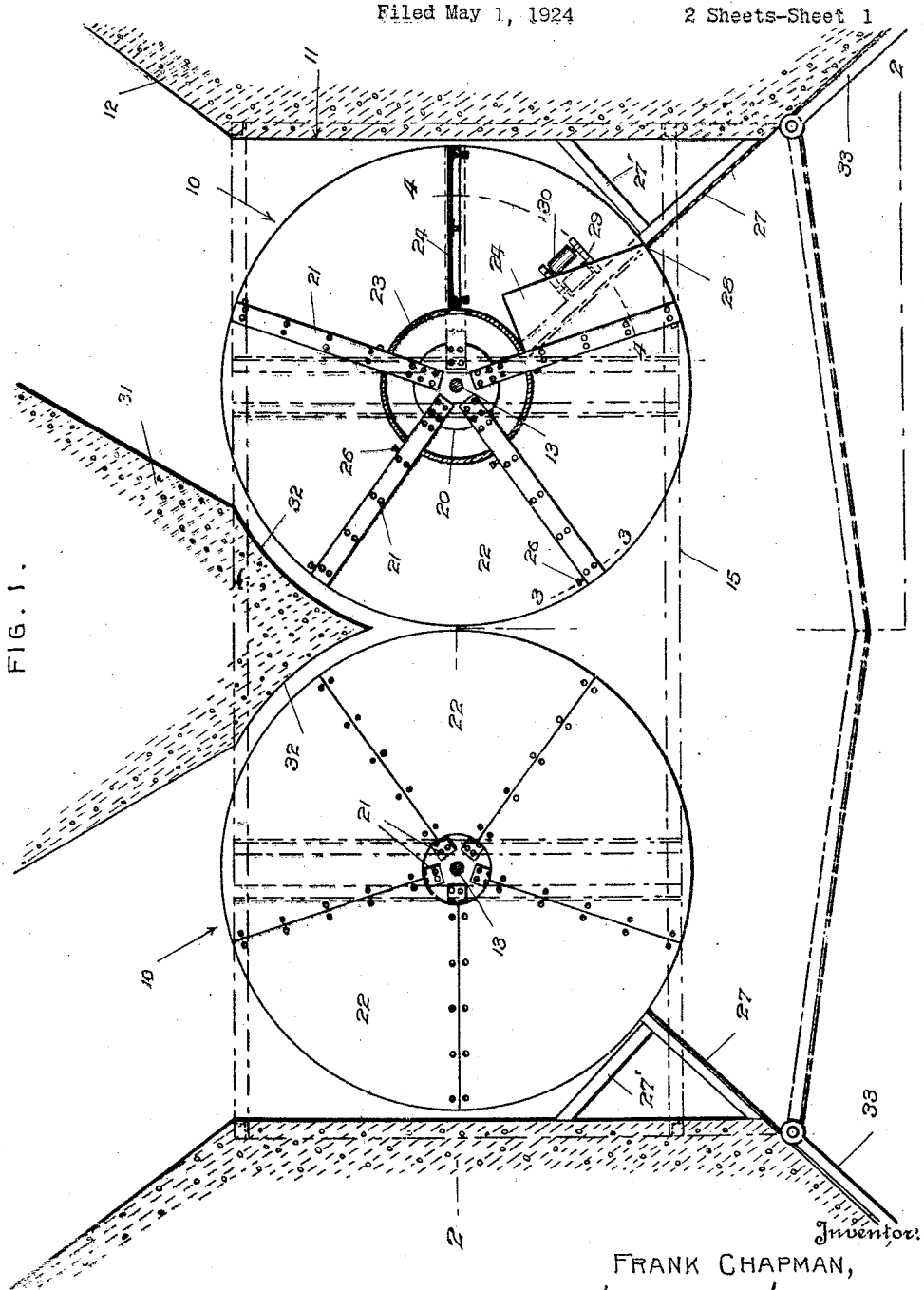

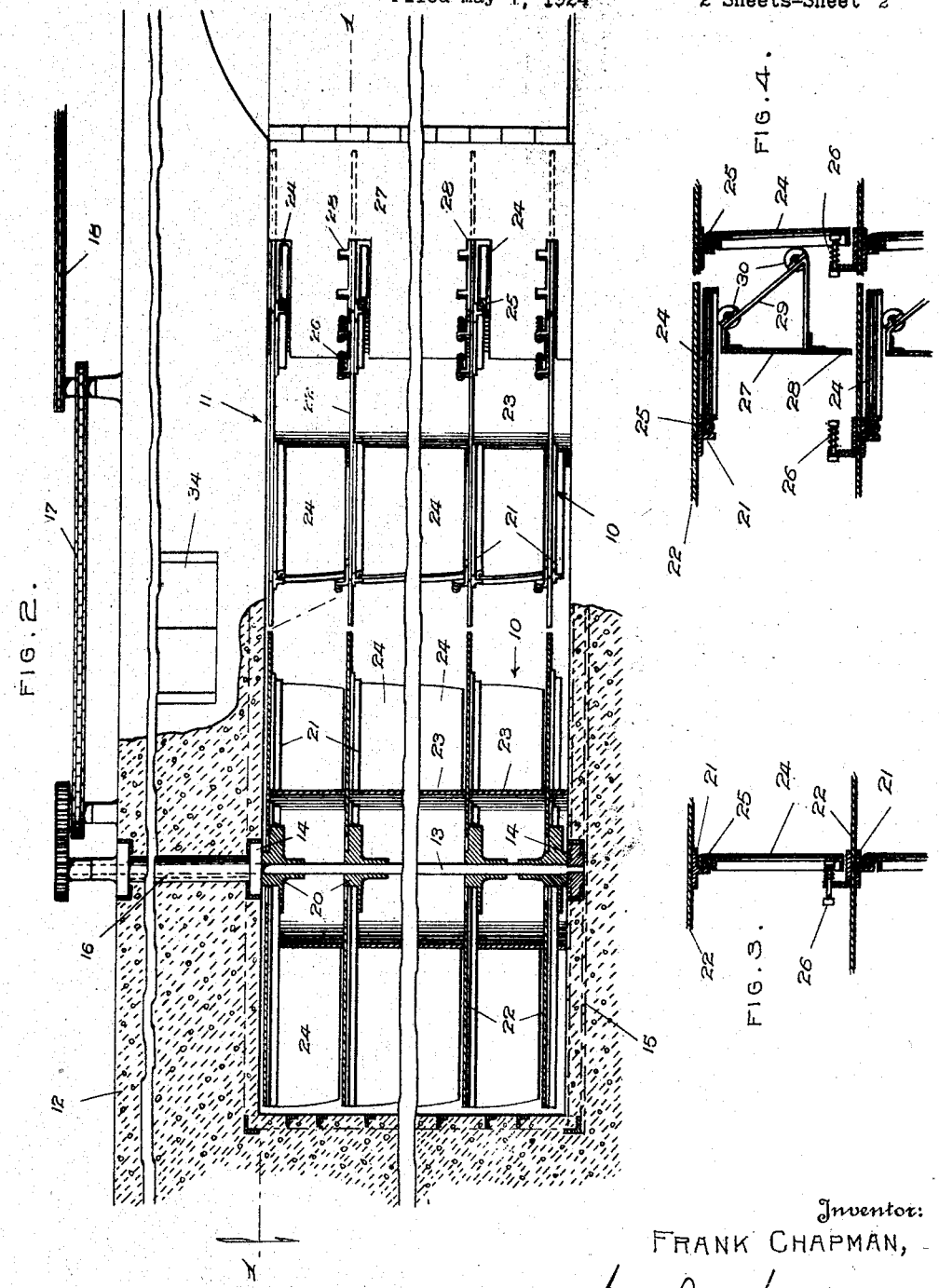

1,542,610

UNITED STATES PATENT OFFICE.

FRANK CHAPMAN, OF WINAMAC, INDIANA.

WATER MOTOR.

Application filed May 1, 1924. Serial No. 710,348.

*To all whom it may concern:*

Be it known that I, FRANK CHAPMAN, a citizen of the United States, residing at Winamac, in the county of Pulaski and State of Indiana, have invented certain new and useful Improvements in Water Motors, of which the following is a specification, reference being had therein to the accompanying drawing.

The present invention relates to water motors, and has for its object the provision of a novel and improved water motor structure for obtaining power from rivers and streams.

Another object of the invention is the provision of a water motor having a novel and improved power unit including a rotor rotatable about a vertical axis, hinged blades carried by the rotor, and a deflector for directing the water toward the blades to obtain maximum power, said blades passing through the deflector in folded or feathered arrangement.

With the foregoing and other objects in view, which will be apparent as the description proceeds, the invention resides in the construction and arrangement of parts as hereinafter described and claimed, it being understood that changes can be made within the scope of what is claimed, without departing from the spirit of the invention.

The invention is illustrated in the accompanying drawings, wherein—

Figure 1 is a view taken on the line 1—1 of Fig. 2 showing a double power unit, one rotor being shown in plan and the other in horizontal section.

Fig. 2 is a section on the line 2—2 of Fig. 1, showing one rotor in elevation and the other rotor in vertical section.

Figs. 3 and 4 are vertical sectional details on the respective lines 3—3 and 4—4 of Fig. 1.

As shown, a double power unit is provided, consisting of a pair of rotors or water wheels 10 disposed side by side within an opening or passage 11 of a dam 12. Said rotors are secured to vertical shafts 13 which are journaled in bearings 14 at the top and bottom of the opening 11, said bearings being secured to a skeleton frame 15 which extends around the opening, said frame being preferably embedded in concrete to provide a rigid and permanent structure. As shown, the shafts 13 extend upwardly through tubes 16 to the top of the dam, and are connected at their upper ends by gearing 17 so that the two rotors turn simultaneously in opposite directions, and the power can be taken from either shaft 13 by suitable power transmitting means 18.

Each rotor or wheel 10 is rotatable about the vertical axis of its shaft 13, and comprises vertically spaced hubs 20 secured to the shaft and a plurality of radial spokes 21 secured to each hub on which are secured the sector-shaped plates 22 forming vertically spaced disks dividing the rotor into superimposed sections. The central portion of the rotor is closed off by cylindrical partitions 23 disposed between the plates 22 and spokes 21, and said partitions having their edges secured to the spokes and plates will also brace and strengthen the frame of the rotor. Blades 24 are hinged, as at 25, to the spokes 21 between the disks of the rotor, to swing rearwardly and upwardly, with reference to the direction of rotation of the rotor, to horizontal positions against the disks immediately above the respective blades, so that the blades can move edgewise. Stops 26 are secured on the plates 22 and spokes 21 for the contact of the lower or free edge portions of the blades, when the blades swing downwardly, and said stops are preferably in the form of spring cushioned buffers to yield slightly when the blades are swung against said stops, said stops being yieldable, as seen in Fig. 3.

The adjacent portions of the two rotors move in the direction of the flow of water through the opening 11, and to direct the water to flow between the rotors, converging deflectors 27 extend obliquely rearward from the mouth of the opening 11 toward the shafts 13, said deflectors being constructed of sheet metal plates secured by braces 27' to the frame 15. The deflectors 27 extend to the partitions 23, and said deflectors have slots 28 to accommodate the disks of the rotors and to permit the blades 24 to pass the deflectors when said blades are swung upwardly to folded or feathered positions.

The opposite portions of the two rotors move forwardly behind the deflectors 27 in a direction opposite to the flow of the water, and the blades 24 are moved in the same direction through the deflectors 27. The blades are folded or feathered so as to move through the slots 28. To facilitate the folding or feathering of the blades, brackets 29 are secured to and extend rearwardly from the deflectors 27 and have rollers 30 for the contact of the blades 24, said blades being dragged over the rollers, which will swing the blades upwardly against the disks, to pass through the slots 28, as apparent by reference to Fig. 4. As soon as the blades have passed through the slots, they are free to swing downwardly against the stops 26 so as to receive the pressure of the water which flows between the rotors, thereby driving the rotors for obtaining the power from the water. When the blades are swung downwardly between the disks of the rotors, the rotors are formed with buckets between the blades and disks for receiving the water and compelling the rotors to turn.

A deflector 31, which may be of concrete, is provided immediately behind the adjacent portions of the two rotors, and has the diverging deflecting surfaces 32 close adjacent to the peripheries of the rotors, in order to direct the water along diverging lines at the rear portions of the rotors, so that the water follows the peripheries of the rotors to the rear portions of the rotors. This will obtain maximum power from the water, and by the use of the deflectors 27 and 31, the water moves around with the rotors for more than one-half of a circle with each rotor.

Suitable gates 33 can be provided in front of the rotors for closing the opening 11, and the dam 12 can have one or more gates 34 above the opening 11 for the discharge of water through the dam over the motor if desired. Other provisions can also be made for controlling the flow of water and the level thereof above the dam.

Having thus described the invention, what is claimed as new is:—

A water motor comprising a rotor rotatable about a vertical axis and having vertically spaced disks and a cylindrical central portion, radial blades between the disks and hinged at their upper edges to the corresponding disks above the blades to swing rearwardly and upwardly toward said disks, the inner ends of said blades extending to the central portion of the rotor, a water deflector extending between the disks to said central portion of the rotor and having slots for the passage of disks and the blades when swung rearwardly and upwardly, and stops carried by the corresponding disks below the blades for the contact of the lower edge portions of the blades when the blades are swung forwardly to operative position.

In testimony whereof I hereunto affix my signature.

FRANK CHAPMAN.